No. 729,827. PATENTED JUNE 2, 1903.
D. H. WILSON.
BATTERY.
APPLICATION FILED APR. 30, 1902.
NO MODEL.
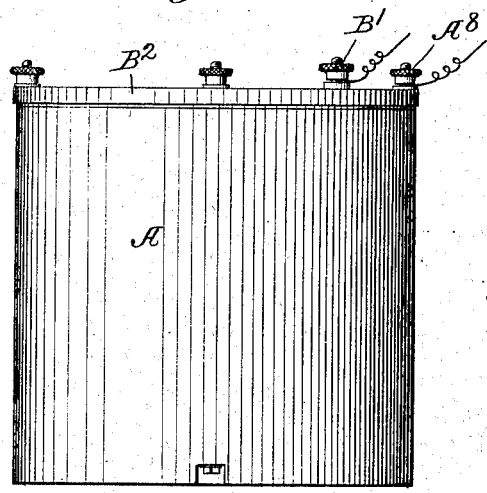
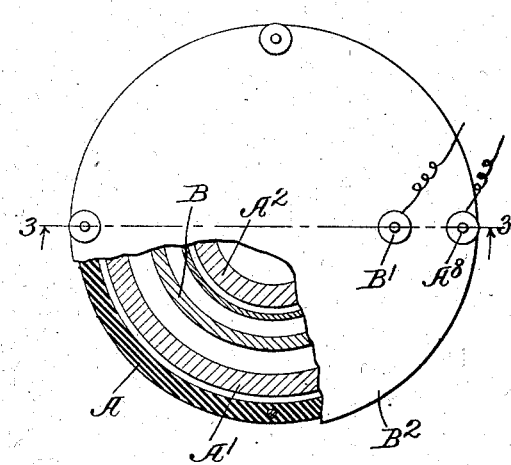
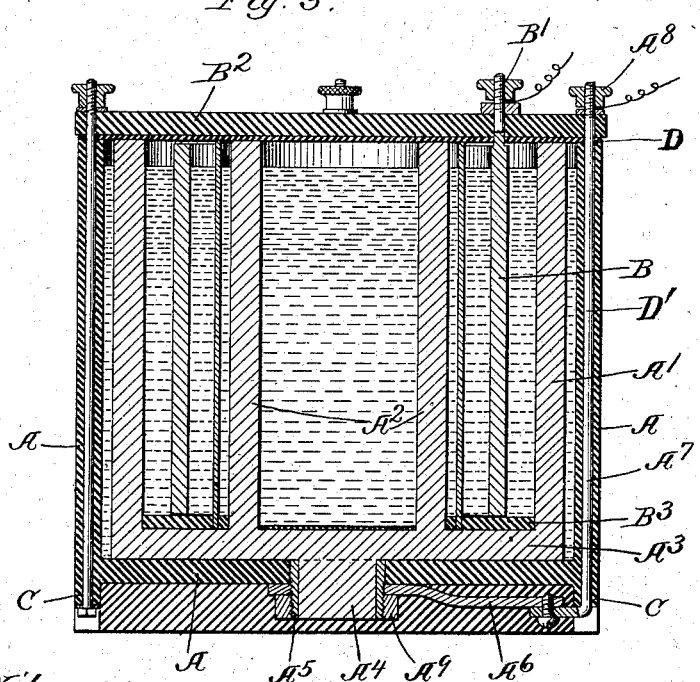
Witnesses.
Edward T. Wray.
Homer L. Kraff.
Inventor.
David H. Wilson
by Parker & Carter
Attorneys.

No. 729,827. Patented June 2, 1903.

UNITED STATES PATENT OFFICE.

DAVID H. WILSON, OF CHICAGO, ILLINOIS.

BATTERY.

SPECIFICATION forming part of Letters Patent No. 729,827, dated June 2, 1903.

Application filed April 30, 1902. Serial No. 105,282. (No model.)

*To all whom it may concern:*

Be it known that I, DAVID H. WILSON, a citizen of the United States, residing at Chicago, in the county of Cook and State of Illinois, have invented a certain new and useful Improvement in Electric Batteries, of which the following is a specification.

My invention relates to electric batteries, and has for its object to provide a new and improved battery, of which the following is a description, reference being had to the accompanying dawings, wherein—

Figure 1 is a view of a battery embodying my invention. Fig. 2 is a plan view of Fig. 1 with parts broken away. Fig. 3 is a section on line 3 3, Fig. 2.

Like letters refer to like parts throughout the several figures.

As herein illustrated, I provide an outer containing portion or jar A, preferably provided at the bottom with an opening. Within the jar is a carbon electrode, which consists of the two carbon cups A' and $A^2$, attached to the same bottom $A^3$ and integral therewith. The inner cup $A^2$ contains the depolarizing solution, while the space between the two cups contains the active solution. A second electrode B, preferably of zinc, surrounds the cup $A^2$ and is contained within the space between the two cups. The carbon electrode is provided with a projecting part $A^4$, which projects through an opening in the bottom of the containing portion or jar. This projection is preferably provided with a metal bushing $A^5$, screw-threaded and to which is connected the conductor $A^6$, connected to the conductor $A^7$, leading to the binding-post $A^8$. This bushing is preferably copper-plated to the carbon or arranged in some other way, so as to secure intimate contact. The jar A is provided at its bottom with the projecting flange C. The conductor $A^6$ is held in place by the holding device or nut $A^9$. When the parts are in position, the portion of the jar below the bottom and contained within the flange C is filled with asphaltum or some similar material, so as to seal and insulate the parts. The electrode B is provided with the binding-post B', and the battery is preferably provided with a cover $B^2$. I prefer to insert between the cover and the jar a suitable packing D, as shown. The cover may be attached in position by any suitable means. In the drawings I have shown it connected with the jar by means of the rods D'. The electrode B is provided with a suitable insulating-piece $B^3$, upon which it is supported.

By means of this construction I am enabled to provide a battery of great efficiency adapted to a large variety of uses.

This battery is particularly adapted to be used as a closed-circuit battery. In this event I place a very strong depolarizing solution in the cup $A^2$. Ordinarily the bottom $A^3$ and a portion of the sides of the outer cup A' are copper-plated, as well as the projection $A^4$. I also prefer to saturate the projection $A^4$ with paraffin or beeswax or a mixture thereof or some other suitable material, and this may be done by heating the carbon and then pouring the heated material in the cup $A^2$ and permitting it to enter the pores of the carbon.

In the use of carbons with electric batteries the salts of the batteries work up, as it were, toward the top and tend to corrode and destroy the terminals, binding-posts, and the like. By making the contact with the carbon at the bottom, as herein shown, I avoid this trouble.

I claim—

1. An electrode for electric batteries, comprising two cups or receptacles integral with each other and separated by a suitable space, said inner cup surrounded by a complete free space and making contact with the outer cup only at the bottom, both of said cups having a comparatively smooth unbroken surface, so that they hold the liquid of the battery.

2. An electric battery, comprising two electrodes, one electrode having two projecting cups or receptacles, separated by a space and having the same bottom with which they are integral, said cups or receptacles being entirely free from each other except at the bottom and having comparatively smooth faces, the other electrode adapted to fit within the space between the two cups.

3. An electric battery, comprising two electrodes, one electrode having two projecting cups or receptacles, separated by a space and having a common bottom piece with which they are integral, a connection at the bottom of said electrode by means of which it is connected in circuit, and a second electrode located within the space between said two cups so as to be opposed to both.

4. An electric battery, comprising two electrodes, one electrode having two projecting cups or receptacles, separated by a space and having the same bottom with which they are integral, the other electrode adapted to fit within the space between the two cups, and a conductor leading from a binding-post at the top of the battery to the bottom of the carbon electrode.

5. An electric battery, comprising a holding-jar having an opening at the bottom, a carbon electrode, comprising two cups separated by a space, both cups attached to the same bottom and integral therewith, a projection extending through the bottom of the battery-receptacle, a conductor leading from said projection to the binding-post and a second electrode contained within the space between the two carbon cups.

6. An electric battery, comprising a holding-jar having an opening at the bottom, a carbon electrode, comprising two cups separated by a space, both cups attached to the same bottom and integral therewith, a projection extending through the bottom of the battery-receptacle, a conductor leading from said projection to the binding-post, a second electrode contained within the space between the two carbon cups, and means for sealing the bottom of the battery, substantially as described.

DAVID H. WILSON.

Witnesses:
FANNY B. FAY,
HOMER L. KRAFT.